Figure 1:
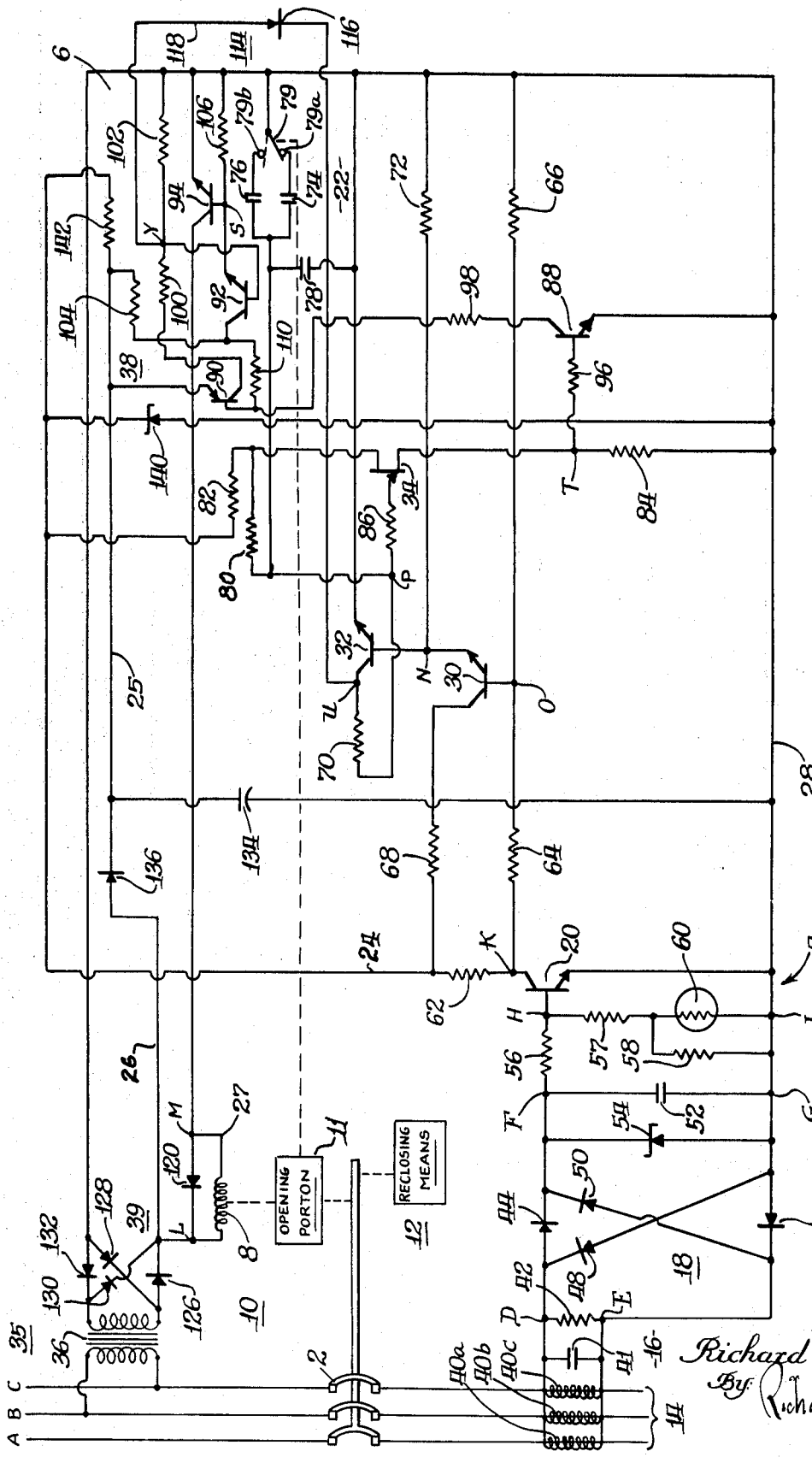

United States Patent [11] 3,567,997

| [72] | Inventor | Richard J. Moran |
| | | Milwaukee, Wis. |
| [21] | Appl. No. | 741,781 |
| [22] | Filed | July 1, 1968 |
| [45] | Patented | Mar. 2, 1971 |
| [73] | Assignee | McGraw-Edison Company |
| | | Elgin, Ill. |

[54] FAULT SENSING AND ACTUATING MEANS FOR REPEATING CIRCUIT INTERRUPTER
7 Claims, 2 Drawing Figs.
[52] U.S. Cl. .................................................. 317/22, 317/36, 317/33
[51] Int. Cl. ...................................................... H02h 5/00, H02h 3/08
[50] Field of Search ........................................... 317/36, 22, 33

[56] References Cited
UNITED STATES PATENTS

| 3,328,638 | 6/1967 | Reis ................................ | 317/22 |
| 3,345,539 | 10/1967 | Ashenden et al. ............ | 317/33 |
| 3,373,317 | 3/1968 | Gilker ......................... | 317/22 |

Primary Examiner—William M. Shoop, Jr
Assistant Examiner—Harvey Fendelman
Attorney—Richard C. Ruppin ABSTRACT: A fault sensing and actuating system including a circuit for detecting a fault current condition, a circuit for providing a time delay in response to the detecting circuit and then supplying a triggering pulse and an actuating circuit initially energized by the triggering pulse and subsequently self-maintained in an energized condition. The actuating circuit causes an opening operation of a repeating circuit interrupter and is deenergized in response to the detecting circuit when the fault current condition is no longer detected.

Inventor:
Richard J. Moran
By Richard C. Ruppin
Atty.

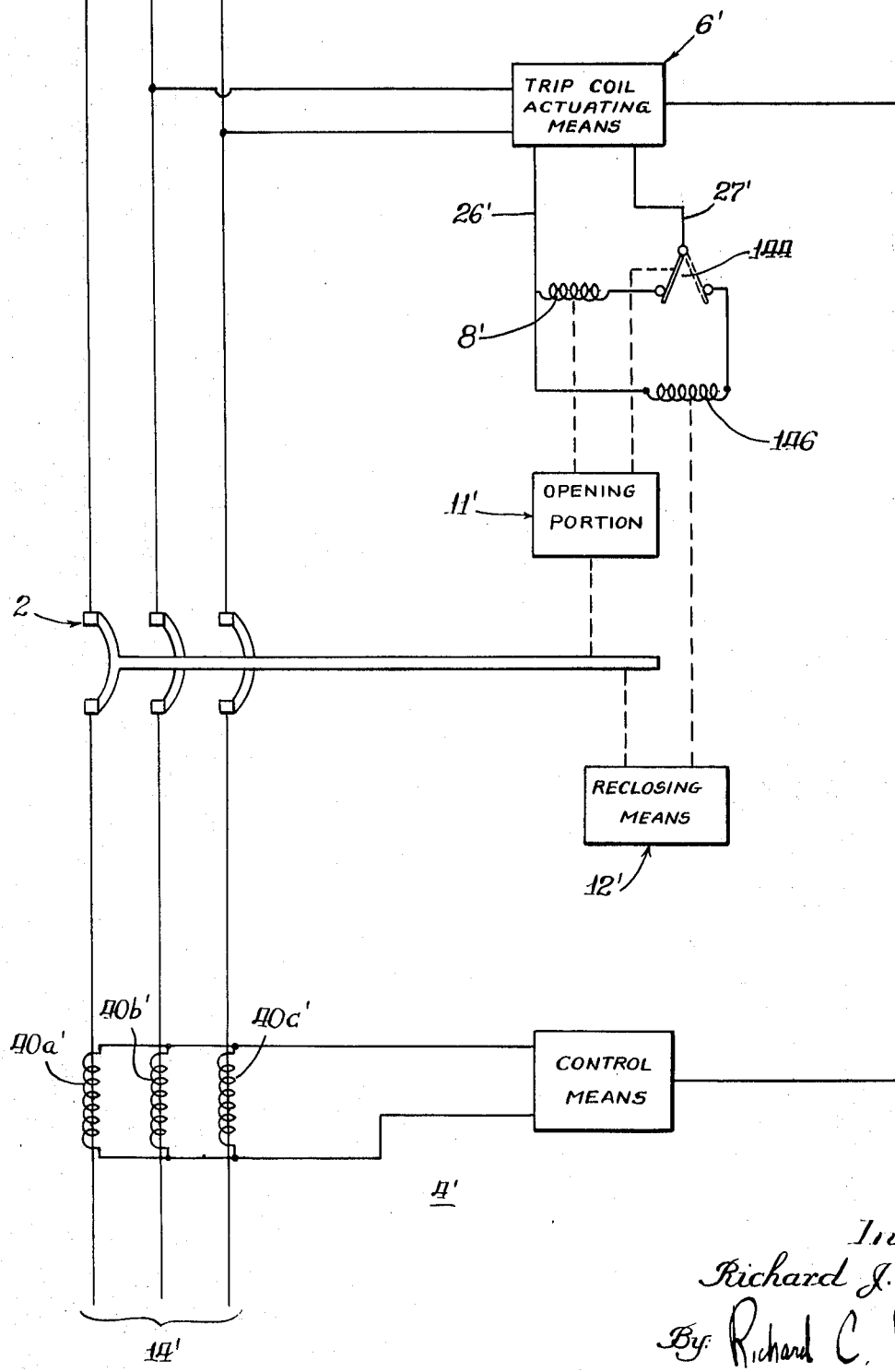

FAULT SENSING AND ACTUATING MEANS FOR REPEATING CIRCUIT INTERRUPTER

This invention relates to repeating circuit interrupters of the class commonly known as reclosers and, more particularly, to fault sensing means for reclosers.

A recloser may be characterized as a circuit protective device having control means including a fault sensing means, interrupting switches, switch opening means and reclosing means which may include operation counting and lockout means. In operation, the fault sensing means of the recloser will detect a fault current in the electrical system being protected and actuate the switch opening means to open the switches after a predetermined time delay. The reclosing means will subsequently close the switches after a closing time delay and, in the event that the fault has not cleared from the protected system, the fault sensing means will again actuate the switch opening means. If the fault continues after a predetermined number of opening and closing operations, the lockout means will operate to lock the reclosing means open and prevent further reclosing operations. Reclosers are generally installed in electrical systems in a main line or at the origin of a branch line which in turn supplies other subsidiary lines that are protected by fuses or sectionalizing switches. When a fault occurs in the system on the load side of the recloser, it typically is required that the recloser execute one or more fast opening operations in which the time delay prior to opening is relatively short. If the fault does not clear during the fast opening operations, at least one delayed opening operation is required in which the time delay is of a sufficient duration to allow melting of the fuse or opening of the sectionalizing switch protecting the faulted subsidiary line. If the fault does not clear during the delayed opening operations, the recloser switches are opened and thereafter held open or "locked out".

A fault may be classified as one of four types, that is, a three phase fault, a phase to phase fault, a phase to phase to ground fault and a one phase to ground fault. The first three types of faults are generally of substantially greater current magnitude than a single phase to ground fault which produces a ground current of very low magnitude. Also, the phase to phase to ground fault may produce a low magnitude current if the impedances between phases and between phase to ground are large. As a consequence, the typical recloser phase fault sensing means will not usually detect the ground fault current. Thus, a separate ground fault sensing means is necessary if the recloser is also to provide protection against low current ground faults. A further reason for having a separated ground fault sensing device in a recloser is that it is usually required that the ground fault sensing means cooperate with the switch opening and reclosing means to provide different time delays for each opening and a different number and/or sequence of delayed openings than the time delays and delay sequences used when the reclosing means is operated in response to the phase fault sensing means. The opening means should be operable by either sensing means, however, so that when a fault occurs which is detected by both sensing means the opening delay is determined by the shortest associated time delay. The number of opening operations performed before lockout occurs should be similarly controlled, where the fault is detected by both sensing means, by the fault sensing means allowing the least number of opening operations in its sequence.

Although presently known ground fault sensing devices are generally more sensitive than phase fault sensing devices, the former are not sufficiently sensitive to detect ground faults of very low magnitude and actuate recloser opening means.

It is an object of this invention to provide a highly sensitive ground fault sensing means capable of detecting a very low magnitude ground fault current.

Another object of the invention is to provide ground fault sensing means for detecting low magnitude ground fault currents and actuating recloser switch opening means in response thereto.

Another object of the invention is to provide a ground fault sensing means for detecting low magnitude ground fault currents and actuating recloser switch opening means in response thereto which is constructed entirely of static components.

Another object of the invention is to provide a low magnitude ground fault current sensing device including an actuating means for controlling the operation of recloser switch opening means wherein the actuating means is operated and maintained in an operating condition until after the switch opening means has opened the recloser switches.

A further object of the invention is to provide a ground fault current sensing device which both initiates and terminates the operation of the actuating means controlling the operation of the recloser switch opening means.

A still further object of the invention is to provide ground fault current sensing means entirely energized from the protected system and which controls recloser switch opening means to operate at a fixed time after the occurrence of the fault which is not a function of the fault current.

The objects of the invention are achieved by providing a highly sensitive fault sensing and actuating means for controlling the operation of a recloser switch opening means. The fault sensing and actuating means is electromagnetically coupled to an alternating current electrical system and mechanically connected to the switch opening means of a recloser having switches for interrupting the electrical system. When a ground fault occurs in the system it will be detected through the electromagnetic coupling and, after a preselected fixed time delay, the actuating means is operated and maintained in an operating condition until the fault current is no longer detected.

Other objects and advantages of the invention will in part be obvious and will in part appear hereinafter. For a fuller understanding of the nature and objects of the invention, reference should be had to the following detailed description taken in connection with the accompanying drawings in which:

FIG. 1 is a schematic illustration of a recloser incorporating the circuit of the instant invention; and FIG. 2 is a schematic circuit diagram showing another embodiment of the invention.

Referring to the drawings in greater detail, the repeating circuit interrupter is shown to include main switches 2, control means 4, trip coil actuating means 6, switch opening means 10 including trip coil 8, switch opening portion 11 and switch reclosing means 12. The control means 4 functions to sense an abnormal condition such as a ground fault current in the alternating current electrical system 14 and after a predetermined time delay, initiate operation of the trip coil actuating means 6 which, in turn, actuates the trip coil 8. The opening portion 11 of the switch opening means 10 is mechanically connected to the trip coil 8 and to the main switches 2. The actuating of the trip coil 8 causes opening of the main switches 2 by switch opening means 10 which is of a type well known in the art. The main switches 2 may then be reclosed by the reclosing means 12 after a suitable time delay. The reclosing means 12 is of a type well known in the art and typically provides a time delay before reclosing and is locked open after a predetermined number of reclosing operations have occurred.

The control means 4 includes a sensing circuit 16 which detects a ground fault current in the system 14 and converts the current to a voltage, a full wave rectifier 18 for rectifying the AC voltage from the detecting circuit 16 and a time delay circuit 22. The control means 4 also has a threshold device comprising transistor 20 which is responsive to the voltage due to the fault current for initiating operation of the time delay circuit 22. During normal operating condition of the fault sensing and actuating system, which exists while the electrical system 14 is energized and no ground fault is present on the system 14, a positive (+) DC voltage is maintained on the conductors 24, 25 and 26 and a negative (−) DC voltage is maintained on conductor 28. During this normal operating condition, the transistors 30 and 32 which are connected between the conductors 24 and 28 are held in an "on" condition so that time delay circuit 22 will not operate to turn unijunction transistor 34 "on" to initiate operation of the trip coil actuating means 6. Consequently, the trip coil 8 will not be energized and the main switches 2 will remain closed to maintain the system in its normal condition. The trip coil actuating means 6 includes transistor relay circuit 38 and a DC power supply 35 having a potential transformer 36 which may be connected to the system 14 and a full wave rectifier 39. The rectifier 39 supplies the positive (+) DC voltage to conductors 24, 25 and 26 and negative (−) DC voltage to conductor 28. When a ground fault current does occur on the system 14, the transistors 30 and 32 are turned "off" and after a selected time delay the voltage transistor relay circuit 38 operates to maintain an energizing circuit through the trip coil 8 until the control means terminates operation of the transistor relay circuit 38.

With reference to FIG. 1, the current transformers 40a, 40b and 40c are respectively coupled to phases A, B and C of the AC electrical system 14. The current transformers 40a, 40b and 40c are connected in parallel in such manner that when no ground fault current is present on any of the phases A, B and C, the sum of the currents produced by the current transformers at junctions D and E is zero. When a ground fault occurs on one of the phases A, B or C, a corresponding fault current flows in one of the associated current transformers so that a current is produced at junctions D and E. This current flows through the resistor 42 which is connected between junctions D and E to establish a voltage across junctions D and E which is proportional to the value of the fault current. The capacitor 41 provides surge protection for circuit components adjacent the current transformers.

The voltage across junctions D and E is rectified by the full wave diode rectifier 18 which includes diodes 44, 46, 48 and 50. A capacitor 52 is connected between junctions F and G to filter the rectified voltage and to provide a relatively continuous triggering voltage for transistor 20 when a fault current occurs. The capacitor 52 may also be of a value which aids in providing a time delay sufficient to prevent triggering of the transistor 20 and operation of trip coil actuating means 6 in response to an overcurrent condition lasting only one-half cycle. A Zener diode 54 is provided to protect the circuit components adjacent the current transformer input from overvoltage conditions caused by heavy fault currents. The Zener diode 54 has a breakdown value less than the maximum voltage which may be sustained by the circuit elements adjacent the current transformers. The resistor 56, connected in the circuit adjacent the base of transistor 20, is utilized to set the operating point of the transistor 20. The transistor 20 operates in response to a particular trigger voltage value which is dependent on the emitter-base characteristic of the transistor. Since the emitter-base characteristic of the transistor 20 changes with a change in temperature, so does the trigger voltage necessary to turn the transistor 20 to an "on" condition. To compensate for this change in trigger voltage, the resistors 57 and 58 and thermistor 60, which has a negative temperature coefficient, are connected between the junctions H and J. The trigger voltage is the voltage drop between the junctions H and J and the value of the resistors 57 and 58 and thermistor 60 are selected to the maintain this voltage drop substantially at a predetermined value at all temperatures. The resistance of thermistor 60 is a maximum value at low temperatures so that the voltage drop across the junctions H and J is also a maximum value since it is determined by the voltage drop across both of the resistors 57 and 58. Thus, a high trigger voltage which is required to operate the transistor 20 at low temperatures is established. At high temperatures, the resistance of the thermistor 60 is low so that the voltage drop across the junctions H and J is determined largely by the voltage drop across the resistor 57. This voltage drop is lower and establishes the trigger voltage required to operate the transistor 20 at higher temperatures.

In the time delay circuit 22, the resistor 62 is connected between the positive conductor 24 and the junction K and serves substantially to set the current into the base of transistor 30 to maintain transistor 30 in an "on" condition when the transistor 20 is not conducting. The resistors 64 and 66 limit the current flow into the base of transistor 30 when the transistor 20 is "on" so that transistor 30 will be held in an "off" condition. The base of the transistor 30 is connected between the resistors 64 and 66 at junction O and the emitter of transistor 30 and the base of transistor 32 are connected together at junction N. The resistors 68 and 70 respectively limit current flowing to the collectors of transistors 30 and 32. The resistor 72 is connected between the base of transistor 32 and the negative conductor 28 to set the triggering voltage of transistor 32 when current flows from the emitter of transistor 30.

As previously discussed in general terms, when the system 14 is operating normally and no ground fault is present, the time delay circuit 22 will not supply the trigger voltage necessary to actuate the transistor relay circuit 38 of the trip coil actuating means 6. More specifically, when the transistor 20 is in an "off" condition, current will flow from the positive conductor 24 into the base of transistor 30 through resistor 64 to establish the trigger current and voltage necessary to turn transistor 30 to an "on" condition. When transistor 30 is conducting, current from its emitter causes the potential of junction N to be raised to a value which triggers transistor 32. When transistor 32 is conducting, current flowing between positive conductor 24 and negative conductor 28 is shunted through it and around the timing capacitors 74, 76 and 78 so that none of the capacitors can charge to the voltage level necessary to trigger the unijunction transistor 34.

When a fault current occurs on the system 14, the voltage drop across junctions H and J will attain a value which will trigger transistor 20. When transistor 20 conducts, the previous base current of transistor 30 is shunted to the negative conductor 28 so that the potential at junction O is insufficient to hold transistor 30 biased in an "on" condition. When transistor 30 stops conducting, transistor 32 also is turned to an "off" condition. The current formerly flowing between conductors 24 and 28 through transistor 32 now starts to charge capacitors 78 and 74 or 76. The capacitor 74 is of a larger capacitive value which, together with capacitor 78 will provide a relative short charging time delay. The capacitor 76 with capacitor 78 provides a longer charging time delay. Whether capacitor 74 or capacitor 76 is charged with capacitor 78 depends on the position of the single-pole double-throw capacitor switch 79 which has terminals 79a, 79b and 79c respectively connected to the capacitors 74 and 78 and negative conductor 28. As shown in FIG. 1, the position of capacitor switch 79 is controlled by the switch opening means 10 which can be adjusted to change the position of the switch after a predetermined number of opening operations. When the electrical system 14 is in a normal condition and no fault current is present, the switch 79 connects terminals 79a and 79c, as shown in full lines in FIG. 1. Thus, when a fault occurs, the time delay prior to operation of the trip coil actuating means 6, energization of the trip coil 8 and operating of the switch opening means 10 will be controlled by capacitors 78 and 74 and will be of a relatively short duration. Assume for example, that it is desired to have the first and second delays prior to opening of the main switches 2 of a short duration and the third opening delayed a longer time. The switch opening means 10 would be adjusted to allow the capacitor switch 79 to remain in its position shown in full lines in FIG. 1 upon its first opening operation and to move the switch 79 to its position shown in dashed lines in FIG. 1 upon its second opening operation. The first and second opening time delays would thus both be short and the third time delay and all opening time delays thereafter until lockout of the reclosing means 12 would be of a long duration.

The potential at junction P and at the emitter of the unijunction transistor 34 are at the same value prior to charging of the capacitors through resistors 82 and 80. Charging of the capacitors causes the potential at the emitter of transistor 34 to rise until its trigger voltage is reached. The resistors 82 and 84 are respectively connected between positive conductor 24 and negative conductor 28 and base-one of transistor 34. The resistors 82 and 84 are preferably of values which will minimize the variation of unijunction transistor 34 trigger voltage with temperature changes. The resistor 86 is connected between junction P and the emitter of unijunction transistor 34 to limit the impulse current through unijunction transistor 34. When the potential at the emitter of the unijunction transistor 34 attains a value which equals a fixed percentage of the potential between positive conductor 24 and negative conductor 28, it will conduct and produce a current pulse flowing from its emitter to base-one and through resistor 84. The current pulse through resistor 84 will cause a momentary rise in potential at junction I and at the base of transistor 88 which exceeds the potential at its emitter.

The transistor relay circuit 38 includes transistors 88, 90, 92 and 94. The resistor 96 is connected between junction T and the base of transistor 88 and limits the current flowing to the base of transistor 88. The resistor 98, connected between the collector of transistor 88 and the base of transistor 90, limits the current flowing to the collector of transistor 88 and, in conjunction with resistors 110 and 104, establishes the potential at the base of transistor 90 to turn it "on". The resistor 100 is connected between the collector of transistor 90 and the junction Y and serves to limit the collector current of transistor 90. The resistor 102 is connected between the negative conductor 28 and the base of transistor 92 and establishes the forward bias potential required to turn transistor 92 to an "on" condition. The resistor 104, connected to the collector of transistor 92, limits the current flowing to the collector. The emitter of transistor 92 and the base of transistor 94 are connected together at junction S and the resistor 106 is connected between junction S and negative conductor 28 to establish he potential required to bias transistor 94 to an "on" condition.

With respect to the operation of the transistor relay circuit 38, when the potential at the base of transistor 88 momentarily rises above the potential at its emitter it is turned to an "on" condition. When transistor 88 conducts, current flows through it from positive conductor 25 to negative conductor 28 through resistors 104, 110 and 98. This flow results in a drop of potential at the base of transistor 90 below that at its emitter so that it will conduct and current will flow through resistors 100 and 102 to conductor 28. The flow of current through resistor 102 raises the potential at the base of transistor 92 above the potential on its emitter to turn it to an "on" condition so that it conducts current from the base of transistor 90 through resistor 110 and through resistor 106 to conductor 28. A secondary base current path is thus established for transistor 90 so that it will now be maintained in its "on" condition. This current path which includes transistors 90 and 92 may be considered as a lock-in circuit for maintaining both transistors 90 and 92 conductive and also maintaining transistor 94 conductive, as described below. Furthermore, the lock-in circuit is in effect self-maintaining in operation upon initial conduction of transistor 90 in response to transistor 88 since transistor 92 provides a conductive biasing path to the base of transistor 90 after transistor 88 ceases to conduct.

It should again be noted that the unijunction transistor 34 produced a short current pulse which turned transistor 88 "on" only momentarily, but nevertheless long enough to allow transistor 92 to be turned "on" and establish the secondary base current path for transistor 90. The current flowing from the emitter of transistor 92 through resistor 106 raises the potential at the base of transistor 94 above its emitter voltage so that it will now conduct and complete a circuit through trip coil 8 between positive conductor 26 and negative conductor 28. The trip coil 8 is thus energized to cause the opening portion 11 of switch opening means 10 to open the switches 2. Since transistor 90 is maintained in an "on" condition after it is initially turned "on", the transistors 92 and 94 are also maintained in an "on" condition so that the energization of trip coil 8 continues until transistors 90, 92 and 94 are turned to an "off" condition. Thus, the trip coil 8 continues to be energized until the switch opening means 10 positively opens the main switches 2 and the fault current is cleared due to the opening of the switches 2. This feature is important where the main switches 2 and the opening portion 11 of the switch opening 10 are immersed in cold oil so that a large amount of inertia is required to be overcome by the switch opening means 10. Under these conditions, energizing of the trip coil 8 for a short duration would not release the operating portion 11 to allow it to open the main switches 2.

A recovery circuit 114 is provided for the purpose of turning the transistors 90, 92 and 94 "off". The recovery circuit 114 includes diode 116 and utilizes transistor 32 in the time delay circuit 22. It will be recalled that after the switches 2 have been opened by the switch opening means 10, a trigger voltage is no longer supplied to transistor 20. Thus, transistors 30 and 32 are again turned to an "on" condition and the current flowing from the collector of transistor 90 to the base of transistor 92 will be diverted or shunted through conductor 118, diode 116 and transistor 32 to negative conductor 28. The potential at the base of transistor 92 will thus decrease to a value equal to its emitter potential so that it will no longer conduct. In the same manner transistor 94 will be turned to an "off" condition to result in the deenergizing of the trip coil 8. Also, when transistor 92 stops conducting, the potential at the base of transistor 90 rises to that of its emitter so that it turns "off" when the trip coil 8 is deenergized, inductive current in its winding discharges to the positive conductor 26 through diode 120 connected across the coil 8 between junctions L and M.

When transistor 32 returned to an "on" condition, current flowing between conductors 24 and 28 is again shunted around capacitors 78 and 74 or 76. Also, when transistor 32 again turns "on", any charge remaining on the capacitors will drain through resistor 70 and transistor 32 so that the capacitors will return to their normal discharged condition. The timing capacitors are discharged and immediately readied for another time delay in this manner either because the fault on the system 14 has been removed by opening of the main switches 2 or because the fault has cleared by itself before opening of the switches 2. The fault sensing and triggering circuit is now reset and in a condition to detect any ground fault current appearing in the electrical system 14 upon the reclosing of the switches 2 by the switch reclosing means 12.

As previously mentioned, a DC power supply 35 is provided for supplying a DC voltage to positive conductors 24, 25 and 26 and negative conductor 28. It should be understood, however, that the DC voltage supply may also be obtained from another suitable source such as a battery. The full wave rectifier 39 of the power supply 35 comprises the diodes 126, 128, 130 and 132. The capacitor 134 connected between conductors 25 and 28 and the diode 136 connected between conductors 25 and 26 function to provide a more constant DC voltage to the control means 4 and the trip coil actuating means 6. The resistor 142 connected between conductors 24 and 25 and the Zener diode 140 connected between conductors 24 and 28 respectively provide current limiting and overvoltage protection for the time delay circuit 22.

In the embodiment of the invention illustrated in FIG. 2, the elements of the fault sensing and actuating system identical with those elements of the fault sensing and actuating system shown in FIG. 1 are referred to by the same reference numerals with the addition of the prime (') designation. Since all identical elements shown in FIG. 2 operate in the same manner as the elements of FIG. 1, their operation will not be further discussed. The identical elements include the electrical system 14', the main switches 2', the control means 4', the trip coil actuating means 6', the switch opening means 10' and the switch reclosing means 12', all shown in block form. The current transformers 40a', 40b', and 40c' comprising part of the control means 4' are shown separately to be electromagnetically coupled to the system 14'. The conductors 26' and 27' are shown connected to the trip coil actuating means 6' and one end of the trip coil 8' is connected to the conductor 26'. A single-pole double-throw lockout switch 144 is shown in full lines in FIG. 2 in its normal position when no ground fault current is present on the system 14'. In this position the lockout switch 144 connects the conductor 27' and one end of the trip coil 8'. In its second position, shown in dashed lines in FIG. 2, the lockout switch 144 completes a circuit between the conductor 26', the lockout coil 146 and the conductor 27'. The lockout switch 144 is normally in the position shown in full lines in FIG. 2 and it remains in this position to allow energization of the trip coil 8' until the predetermined number of opening operations have occurred. On the last opening operation, the operating portion 11' of the opening means 10' will move the lockout switch 144 to the position shown by dashed lines in FIG. 2 so that the last operation of the trip coil actuating means 6' will result in energization of the lockout coil 146. When the lockout coil 146 is energized, the reclosing means 12' which is mechanically connected to the lockout coil 146 is prevented from performing another reclosing operation.

While two specific embodiments of the invention have been shown herein, it will be realized that many modifications thereof are feasible without departing from the spirit and scope of the invention. For example, a switch similar to the capacitor switch 79 may be used both to perform the capacitor switching operation and the lockout switching operation between the trip coil 8' and the lockout coil 146. It is consequently intended in the appended claims to cover all such variations and modifications as fall within the true spirit and the scope of the invention.

I claim:

1. In a circuit interrupter coupled to an electrical system and including switch means having an open and closed condition and means including an electrical coil for moving the switch means to the open condition, the combination comprising, control means including sensing means for detecting the occurrence of an abnormal condition in said system and being operative in response to the occurrence of said condition and coil actuating means connected to said coil, said coil actuating means being effective to energize the coil when an abnormal conditions occurs and being initially operative in response to said control means and thereafter self-maintained in operation until after the switch means is open, said coil actuating means including recovery circuit means operable after said sensing means ceases operation and in response thereto to terminate the operation of said coil actuating means, said recovery circuit means when operative having an energized circuit connection with the electrical system.

2. In a circuit interrupter coupled to an electrical system and including switch means having an open and closed condition and means including an electrical coil for moving the switch means to the open condition, the combination comprising, control means including sensing means for detecting the occurrence of an abnormal condition in said system and being operative in response to the occurrence of said condition, coil actuating means connected to said coil, said coil actuating means being effective to energize the coil when an abnormal condition occurs and being initially operative in response to said control means and thereafter self-maintained in operation until after the switch means is open, and timing means for delaying operation of the coil actuating means after the sensing means becomes operative, said timing means having a shunted condition and a nonshunted condition and being operative only when in the nonshunted condition, and circuit means connected in parallel with the timing means and having a conductive shunting condition to prevent operation of the timing means and a nonconductive condition permitting operation of the timing means.

3. In a circuit interrupter coupled to an electrical system and including switch means having an open and closed condition and means including an electrical coil for moving the switch means to the open condition, the combination comprising, control means including sensing means for detecting the occurrence of an abnormal condition in said system and being operative in response to the occurrence of said condition and coil actuating means connected to said coil, said coil actuating means being effective to energize the coil when an abnormal condition occurs and being initially operative in response to said control means and thereafter self-maintained in operation until after the switch means is open, said coil and coil actuating means having an energized circuit connection with the electrical system and said switch means is simultaneously in its open condition.

4. The combination according to claim 1 wherein said coil actuating means is operated by supplying electrical energy thereto from said system and said energized circuit connection is an energy diverting connection carrying said energy whereby the coil actuating means is deenergized.

5. The combination according to claim 4 wherein said coil actuating means includes first circuit means connected in series with said coil for energizing the coil and said recovery circuit means is connected in parallel with the first circuit means.

6. The combination according to claim 1 wherein said control means includes timing means inoperative when in a deenergized condition and having an energized condition for delaying operation of the coil actuating means, a circuit having a first conductive condition maintaining the timing means deenergized when the switch means is closed and the system is in a normal operating condition, said circuit having a second conductive condition during operation of the recovery circuit means, said recovery circuit means and circuit comprising an energized diverting circuit connected in shunt with the coil actuating means for diverting energy from the coil actuating means during the second conductive condition of the circuit and operation of the recovery circuit means.

7. The combination according to claim 6 wherein the coil actuating means includes first circuit means connected to said coil, said first circuit means being effective to energize the coil, and lock-in circuit means connected to the first circuit means and to the diverting circuit, said lock-in circuit means being conductive after the switch means is open to maintain the first circuit means operative and terminating conduction in response to operation by the diverting circuit.